US006857690B2

(12) United States Patent
Vismara et al.

(10) Patent No.: US 6,857,690 B2
(45) Date of Patent: Feb. 22, 2005

(54) PROTECTIVE STRUCTURE FOR VEHICLES

(75) Inventors: Mario Vismara, Casatenovo (IT); Jean Louis Toneatti, Besana Brianza (IT)

(73) Assignee: Adlev S.r.l., Monza-Milan (IT)

( * ) Notice: Subject to any disclaimer, the term of this patent is extended or adjusted under 35 U.S.C. 154(b) by 0 days.

(21) Appl. No.: 10/081,752

(22) Filed: Feb. 21, 2002

(65) Prior Publication Data

US 2002/0185891 A1 Dec. 12, 2002

(30) Foreign Application Priority Data

Jun. 6, 2001 (IT) ..................................... MI2001A1192

(51) Int. Cl.⁷ .............................................. B60R 27/00
(52) U.S. Cl. .................................. 296/187.09; 293/133
(58) Field of Search ................................. 293/102, 109, 293/120, 121, 132, 133, 136; 296/188, 189, 187.09

(56) References Cited

U.S. PATENT DOCUMENTS

| 3,744,835 A | * | 7/1973 | Carbone et al. ............ 293/120 |
| 3,842,944 A | * | 10/1974 | Shiotani et al. ............ 293/133 |
| 3,997,207 A | * | 12/1976 | Norlin ..................... 293/133 |
| 4,022,505 A | * | 5/1977 | Saczawa, Jr. ............... 293/120 |
| 4,029,350 A | * | 6/1977 | Goupy et al. .............. 293/133 |
| 5,078,439 A | * | 1/1992 | Terada et al. ............. 293/109 |
| 5,139,297 A | | 8/1992 | Carpenter et al. |
| 5,154,462 A | * | 10/1992 | Carpenter ................. 293/120 |
| 5,219,197 A | | 6/1993 | Rich et al. |
| 5,425,561 A | * | 6/1995 | Morgan ................... 293/120 |
| 6,290,272 B1 | * | 9/2001 | Braun ..................... 293/102 |
| 6,435,579 B1 | * | 8/2002 | Glance .................... 293/120 |
| 6,443,513 B1 | * | 9/2002 | Glance .................... 293/133 |
| 2002/0060462 A1 | * | 5/2002 | Glance .................... 293/120 |
| 2002/0149214 A1 | * | 10/2002 | Evans ..................... 293/120 |

FOREIGN PATENT DOCUMENTS

| DE | 100 02 724 A1 | 8/2001 |
| GB | 1 453 426 | 10/1976 |
| WO | WO 00/35610 | 6/2000 |

OTHER PUBLICATIONS (European Patent Office) Patent Abstracts of Japan.
EP Search Report.

* cited by examiner

Primary Examiner—Lori L. Coletta
(74) Attorney, Agent, or Firm—Hedman & Costigan, P.C.

(57) ABSTRACT

A protective structure for vehicles that uses at least one front cross member (17A), flat or shaped, made of metal or plastic, featuring at least one first absorber element or buffer (16), connected externally after the cross member (17A), and/or at least one second absorber element (25), positioned internally, in order to increase energy absorption during impact with respect to traditional structures. The structure can incorporate one or more buffers (16) designed, in particular, to absorb impact between vehicles and pedestrians (so-called pedestrian impact).

8 Claims, 4 Drawing Sheets

PROTECTIVE STRUCTURE FOR VEHICLES

BACKGROUND OF THE INVENTION

1. Field of the Invention

The present invention refers to a protective structure for vehicles.

2. Description of the Related Art

At present, the devices used on vehicles in order to limit damage during insurance or NCAP type crashes, on the front side, consist of completely metallic cross members, generally made of steel, positioned between the vehicle chassis and the bumpers; the cross member usually rests directly on and is fixed to the side members, or metal absorber devices (crash boxes), to which the cross member is connected, are fixed on the side members.

Said structures, however, do not guarantee good efficiency (understood as ratio between energy absorbed and crushing of the system) and, above all, since they have to deform to absorb energy and as they are shaped on the front strip of the bumper, the elements fixed to the side members tend to transmit high levels of stress (also in a tangential direction) on the side members thus obliging the user to adopt reinforcing devices, with consequent increase in the weight of the vehicle.

Furthermore, to adapt said structures to compliance with the requirements of the legislative proposals in the event of impact with pedestrians and, substantially, in the event of impact with the leg of the pedestrian, it is necessary to further distance them from the bumper, positioning in this space absorber elements with pressures of between 0.1 and 0.6 $N/mm^2$, corresponding to a crushing of 50%.

Said absorber elements are generally made of foamed polypropylene, foamed polyurethane or foamed polystyrene.

In this case, however, the minimum space necessary for the installation of said absorber elements is approximately 80 mm+30 mm (the 30 mm residual space being due to densification of the material which occurs during compression of the buffer and beyond which the compression forces are very high).

In short, the above-mentioned solutions are totally unsuitable or lacking in efficiency both to satisfy the regulations concerning impact between vehicles (in particular, the so-called insurance or NCAP type crashes) and to meet the requirements relating to pedestrian impact; furthermore, it is to be hoped that further additional systems will be provided in front of the bumper able to absorb energy during the impact, without requiring too much space between cross member and bumper.

BRIEF SUMMARY OF THE INVENTION

The aim of the present invention is therefore to eliminate the above problems by producing a high-efficiency protective structure for vehicles, designed to receive, in the event of impact with pedestrians, absorber buffers, at the same time obtaining a reduction in space (below or equal to 80 mm) between bumper and protective structure; the structure is also designed to comply with the minimum requirements of the current pedestrian impact regulations, with respect to traditional type protective structures.

This and other aims, according to the present invention, are achieved by producing a protective structure for vehicles, designed to be used particularly in the event of impact with pedestrians, according to claim 1, comprising a substantially linear front cross member (17A) comprising a unitary fillable internal chamber, where said front cross member is connected to lateral side members (22), and featuring at least one first absorber element (16), connected externally after the cross member (17A) on the bumper side of the vehicle.

The characteristics and advantages of a protective structure for vehicles, designed to be used particularly in the event of insurance or NCAP crashes, according to the present invention, will be illustrated more clearly in the following description, intended as a non-restrictive example, referring to the attached schematic drawings in which:

DETAILED DESCRIPTION OF THE INVENTION

With reference to the figures mentioned, 17 indicates a front cross member for vehicles, shaped traditionally (in the particular case of FIG. 1, the cross member 17 is concertina-shaped), in order to absorb energy during a collision; cross member 17 is connected, also in a known way, to two side members or struts 22 of the vehicle.

Figure 1A:
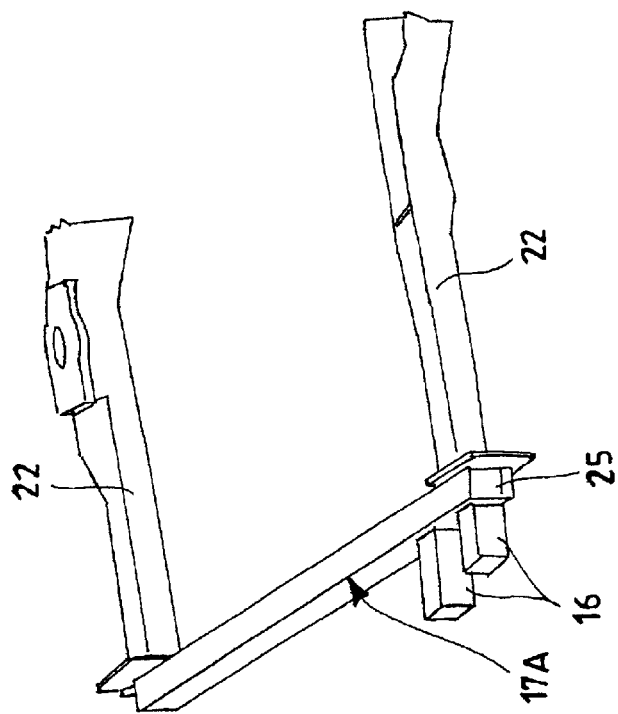
FIG. 1A is a schematic perspective view of a front cross member of a vehicle used in absorption structures for vehicles according to the present invention.
Figure 1:
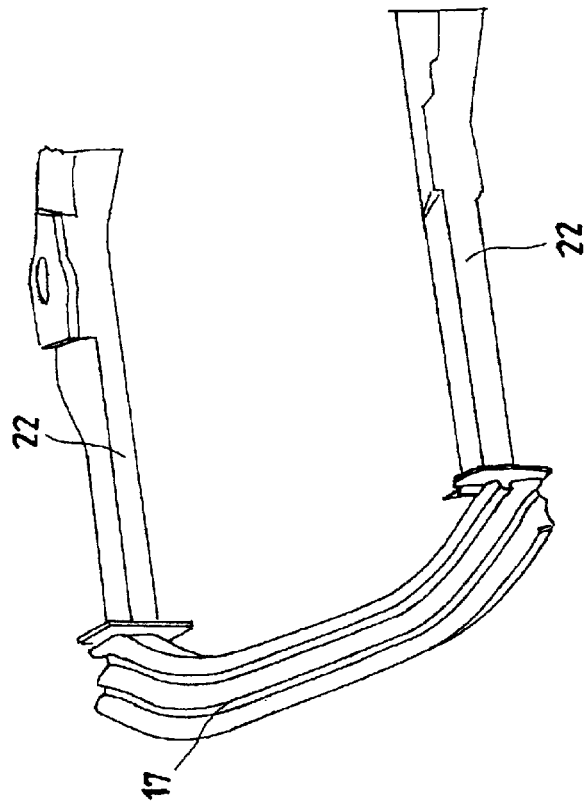
FIG. 1 is a schematic perspective view of a front cross member of a vehicle used in known types of absorption structures.

The solution relating to the protective structure for vehicles, subject of the present invention, features a front cross member, indicated by reference number 17A in FIG. 1A, modified with respect to the traditional cross members 17 as regards physical-geometrical structure and weight.

In particular, a cross member 17A is used, made of metal or plastic, preferably of the flat type, on which at least one first absorber element or buffer 16 operates, placed after the cross member 17A and positioned, in practice, between the vehicle bumper and the cross member 17A itself.

Alternatively a shaped cross member 17A can be produced from an extruded linear profile.

Alternatively a shaped cross member 17A can be produced by moulding and welding.

Furthermore, the cross member 17A can contain inside at least one second absorber element or buffer 25, in order to increase resistance to crushing of the cross member itself, without modifying its thickness, as said modification would lead to a considerable increase in overall weight.

Use of the buffer 25 furthermore permits consequent improvement in performance from the point of view of energy absorption during impact.

Figure 2:
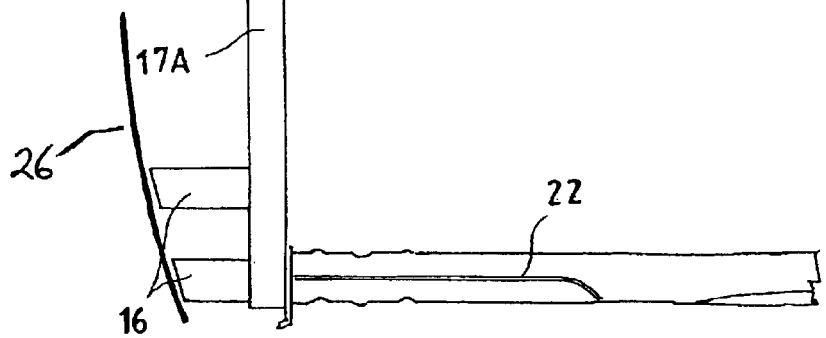
FIG. 2 is a plan view of the cross member of FIG. 1A, according to the present invention.

The resulting structure is illustrated overall in FIG. 2 and provides for the use of buffers 16 (arranged after and outside the cross member 17A, on the bumper side of the vehicle) made of materials having pressure values equal to approximately 5–30 N/mm² at 50% crushing; in this regard, plastic honeycomb (especially the injection-moulded material XENOY® by General Electric) or aluminium honeycombs or sheet metal crash boxes are used preferably, among others, as absorbing materials.

The absorber elements or internal buffers 25 can furthermore have characteristics such as to obtain pressures of 5–30 N/mm² corresponding to a crushing of 50%; also in this case, plastic honeycomb, and especially the injection-moulded material XENOY® by General Electric, or aluminium honeycombs or sheet metal crash boxes are used preferably, among others, as absorbing materials.

The absorber elements 16 are usually positioned laterally with respect to the cross member 17A in order to leave a central space for housing further possible absorber systems such as buffers for pedestrian impact.

Furthermore, the particular position of the buffers 16 means that, especially during a crash at moderate speed, they are the only ones to be damaged, with positive consequences in terms of saving on spare parts and skilled labour.

The solution described above provides excellent performance on the entire vehicle; in particular, extremely good test results were obtained, in terms of sensitive parameters, in the case of an insurance crash.

Figure 4:
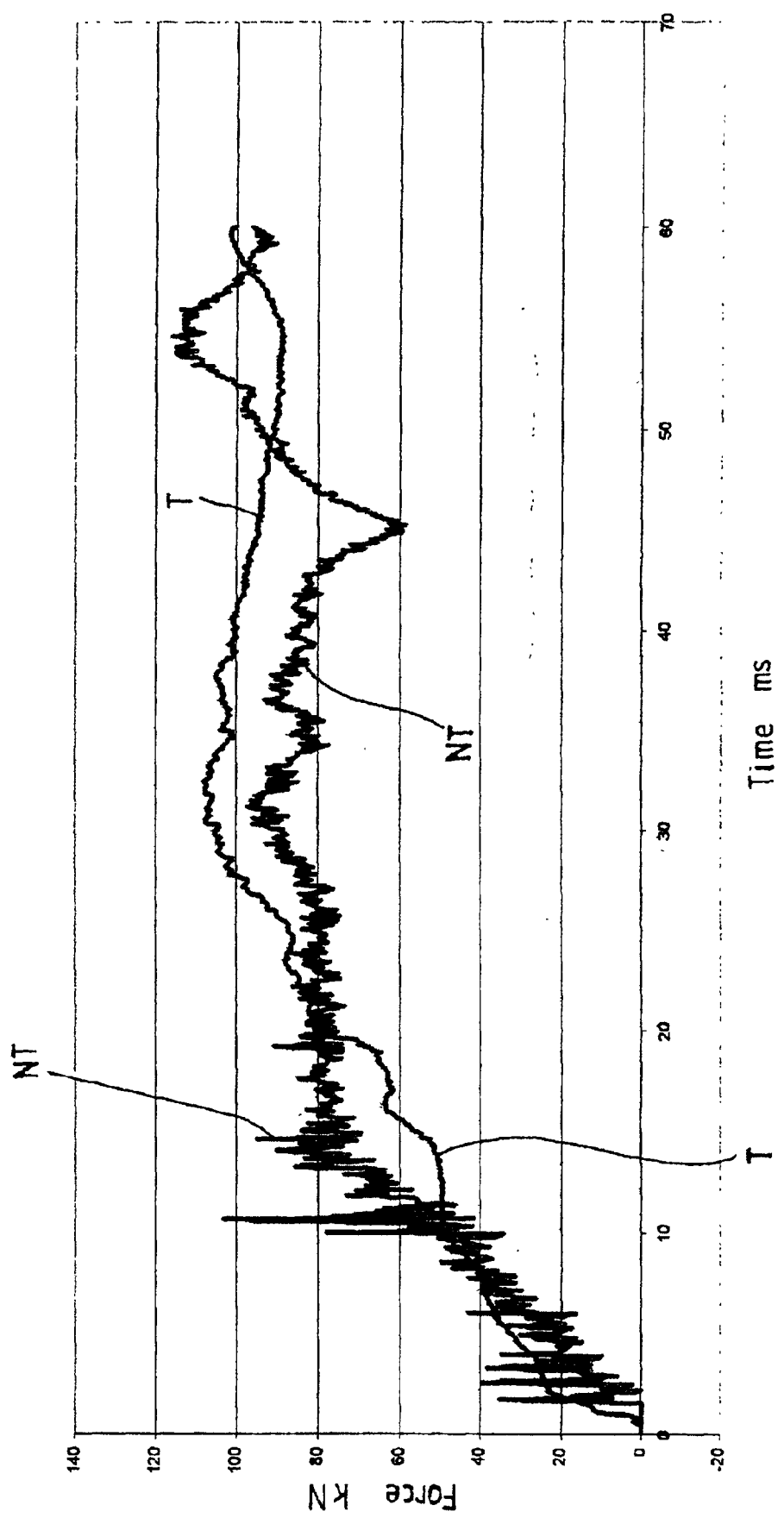
FIGS. 4 and 5 show a series of graphs relating to the time trend of the impact force and the energy absorbed by the systems, during the impact, and produced during a crash between a wall and 40% of the front face of a vehicle travelling at 15 km/h and provided with protective structures both of known type and of the type according to the present invention.
Figure 5:
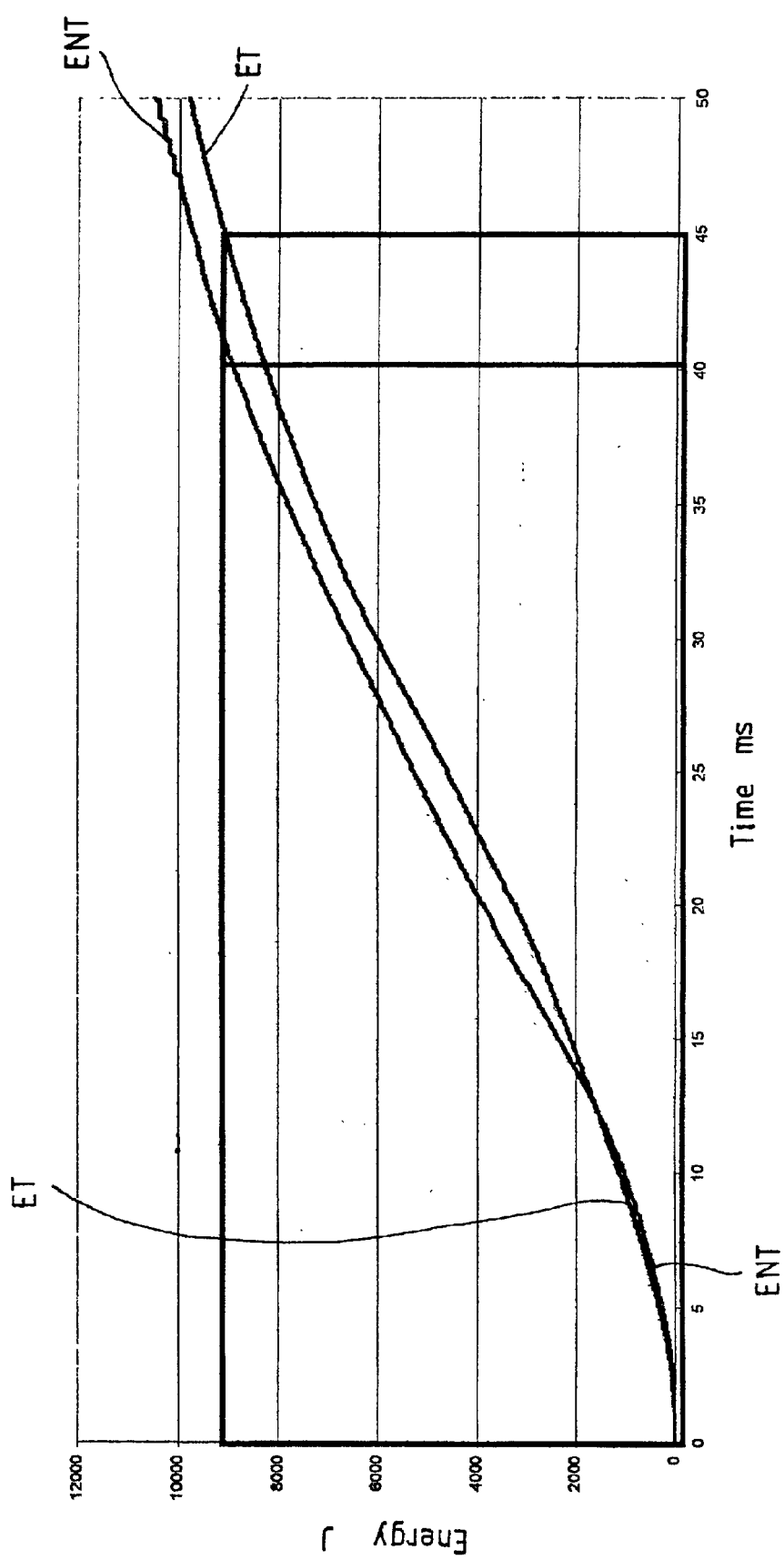

The graphs of FIGS. 4 and 5 firstly highlight that, while the solution described provides a reduction in mean force values with respect to traditional cross members (and this creates less tension on the vehicle structure), greater energy absorption is obtained by the system described, with respect to the known systems, during the impact, by using a modified cross member 17A, according to the invention (curves NT and ENT), instead of a traditional cross member 17 (curves T and ET).

Figure 3:
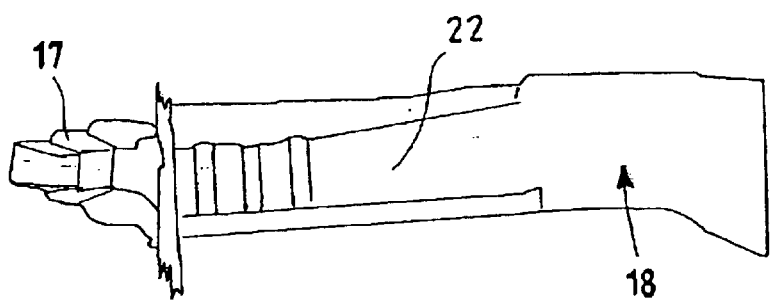
FIG. 3 is a schematic side view of a cross member of known type, in which the effects of a crash are visible, in particular of an insurance crash.
Figure 3A:
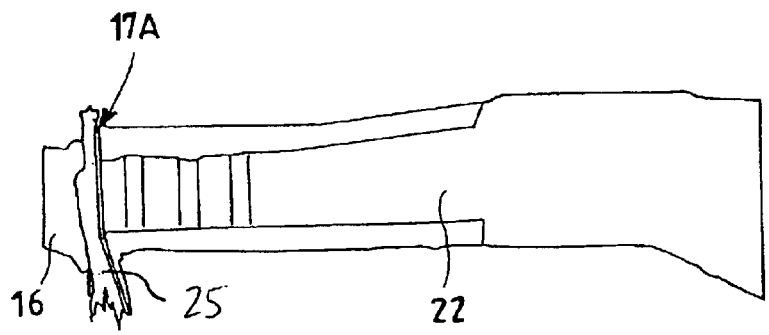
FIG. 3A shows a schematic side view of the cross member of FIG. 1A, according to the present invention, in which the effects of a crash are visible, in particular an insurance crash.

FIGS. 3 and 3A illustrate a further advantage of the absorption structure subject of the invention.

More in particular, the flat or slightly shaped configuration of the cross member 17A according to the invention (fitted with shaped bumper 26 as shown in FIG. 2 in which the curves, shaped like the outer buffers, are very marked) permit minimization of the tangential thrust produced on the side members 22 during the impact.

FIG. 3, which is an example of deformation of a traditional type of cross member 17 during impact, shows how the current shaped cross member deforms during impact, but without modifying its initial length which, due to its shape, is greater than the distance between the two side members.

This produces a lateral thrust on the side members 22, forcing them to open out completely corresponding to area 18; on the other hand, FIG. 3A, which refers to the same test as FIG. 3 and uses a cross member 17A according to the invention, shows the complete deformation of the cross member 17A and the impact energy absorption by the elements 16 and 25, without this producing a strain that cannot be withstood by the struts 22.

It has therefore been demonstrated that, by modifying the currently used front cross member 17 of the vehicle and fitting a different one as regards geometrical shape, overall structure and weight, the test results for the parameters concerning insurance or NCAP type crashes are extremely positive; furthermore, there is a gain in terms of overall dimensions of the entire structure, as good energy absorption values are obtained with a system, according to the invention, that occupies a length, in front of the side members 22, of 1 cm less than the known type of system.

Therefore installation of the front cross member 17A permits the insertion of extremely efficient absorber devices, in particular for pedestrian impact, and does not require the bumper to be moved forward excessively, with respect to the traditional structures, as the entire area in front of the cross member outside the area of the buffers 16 permits housing of said absorber devices; furthermore, the height of the buffers 16 is exploited for compacting of the same in order to obtain good results also in the event of pedestrian impact.

From the description provided, the characteristics of the protective structure for vehicles, designed to be used particularly in the event of insurance or NCAP crashes and (using specific buffers) pedestrian impact, according to the present invention, are clear as are the resulting advantages.

In particular they are represented by:

easy to simultaneously satisfy the various regulations concerning impact at various speeds (in this regard, excellent results are obtained in the event of pedestrian impact, insurance or NCAP type crashes at high speed);

high absorption capacity in the event of an insurance crash, at average-low speeds, for any impact direction;

limited weight and overall dimensions of the entire absorption structure;

limited costs owing to the advantages achieved.

Finally, it is clear that further modifications and variations can be made to the protective structure for vehicles in question, all falling within the context of the inventive idea, and likewise it is also clear that the materials and dimensions illustrated can be varied according to technical requirements.

What is claimed is:

1. Protective structure for a vehicle, comprising a substantially linear front cross member (17A) having two lateral ends comprising a unitary fillable internal chamber, wherein said front cross member is connected to lateral side members (22), and having underlying laterally-placed first absorber elements (16) positioned near each lateral end of said front cross member (17A) on the bumper side of said vehicle, said laterally-placed first absorber element (16) being connected externally after the cross member (17A) and spaced apart to define a central space, at least one second absorber element (25) which increases the force which will cause the collapse of cross member (17A) and the energy absorbed by said cross member (17A) and, simultaneously, limits the overall dimensions of the entire structure, wherein said underlying laterally-placed first absorber elements (16) and said second absorber element (25) are made of materials which deform under pressures of about 5–30 N/mm² which correspond to a crushing of 50% and having an additional absorber system comprising buffers for pedestrian impact interposed in the central space between the laterally-placed first absorber elements (16).

2. Protective structure for vehicles as in claim 1, wherein said cross member (17A) has a substantially straight geometrical structure which is fitted with curved bumper (26) conforming in shape to said underlying laterally-placed first absorber elements (16) and said additional absorber system wherein said absorber elements and said additional absorber system are interposed between said bumper and said cross member.

3. Protective structure for vehicles as in claim 1, wherein said first absorber element (16) and said second absorber element (25) comprise absorbing materials selected from the group consisting of extruded thermoplastic honeycomb, honeycomb made of aluminum, polyurethane foam, foamed polypropylene, rigid polyurethane, semi-rigid polyurethane and extruded polyurethane.

4. Protective structure for vehicles as in claim 1, wherein said cross member (17A) is made of metal or a plastic flat, produced from an extruded linear profile.

5. Protective structure for vehicles as in claim 1, wherein said cross member (17A) is flat and is made of metal or a plastic flat, produced by molding and welding.

6. Protective structure for vehicles, comprising a front cross member (17A) made of metal or plastic having two lateral ends comprising a unitary fillable internal chamber, wherein said front cross member is connected to lateral side members (22), and having at least one underlying laterally-placed first absorber element (16) positioned near the lateral end of said front cross member (17A), said laterally-placed first absorber elements connected externally after the cross member (17A) on the bumper side of the vehicle, wherein inside said cross member (17A), at least one second absorber element (25) is present, which increases the force which will cause the collapse of the cross member, and increases the energy which may be absorbed by said cross member (17A) and, simultaneously, limits the overall dimensions of the entire structure, wherein said underlying laterally-placed first absorber element (16) and said second absorber element (25) are made of materials which deform under pressures of about 5–30 N/mm$^2$ which correspond to a crushing of 50% and having an additional absorber system comprising buffers for pedestrian impact which are interposed in the central space between the laterally-placed first absorber elements (16).

7. Protective structure for vehicles as in claim 6 characterized in that said cross member is produced from an extruded linear profile.

8. Protective structure for vehicles as in claim 6 characterized in that said cross member is produced by molding and welding.

* * * * *